United States Patent [19]
Amano et al.

[11] Patent Number: 5,617,638
[45] Date of Patent: Apr. 8, 1997

[54] BASE ATTACHMENT STRUCTURE APPLICABLE TO CUTTING TOOLS

[75] Inventors: Kunio Amano; Masahiko Ono, both of Anjo, Japan

[73] Assignee: Makita Corporation, Aichi-Pref., Japan

[21] Appl. No.: 567,078

[22] Filed: Dec. 4, 1995

[30]     Foreign Application Priority Data

Dec. 12, 1994  [JP]  Japan .................................. 6-307798

[51] Int. Cl.$^6$ ................................................. B23D 51/02
[52] U.S. Cl. ............................... 30/376; 30/375; 411/399
[58] Field of Search .......................... 30/371, 374, 375, 30/376; 411/399, 412, 413

[56]              References Cited

U.S. PATENT DOCUMENTS

| | | | |
|---|---|---|---|
| 3,087,519 | 4/1963 | McCarty et al. | 30/376 |
| 4,262,421 | 4/1981 | Bergler et al. | 30/393 |
| 4,614,037 | 9/1986 | Somers | 30/392 |
| 5,012,583 | 5/1991 | Biöchle et al. | 30/392 |

FOREIGN PATENT DOCUMENTS

4244079A1  6/1994  Germany .

7-60538  3/1995  Japan .

*Primary Examiner*—Hwei-Siu Payer
*Attorney, Agent, or Firm*—Lahive & Cockfield

[57]              ABSTRACT

A combination of a base attachment structure and a cutting tool, where the base attachment structure includes a connection bolt (8) inserted and movably fitted in an aperture (9a) formed in a curved plate (9) of a gear housing (2) and a cross-shaped slide aperture (11) formed in an arch-shaped projection member (10) extending from a base (7). The connection bolt (8) includes a first upper threaded portion (8a) having threads running in a first direction to form a left-handed screw, and a second lower threaded portion (8b) having threads running in a second direction, opposite to the first direction, to form a right-handed screw. The first threaded portion (8a) is fitted into a hole (12a) formed in a pressure plate (12), whereas the second threaded portion (8b) pierces into an aperture (13a) formed in an arch-shaped clamp plate (13) and is then screwed to a right-handed fixation nut (16). The curved plate (9) of the gear housing (2) and the arch-shaped projection member (10) of the base (7) are interposed between the pressure plate (12) and the clamp plate (13).

6 Claims, 4 Drawing Sheets 5,617,638

BASE ATTACHMENT STRUCTURE APPLICABLE TO CUTTING TOOLS

BACKGROUND OF THE INVENTION

1. Field of the Invention

The present invention relates to a base attachment structure applied to a cutting tool, such as a jig saw, and more specifically to a base attachment structure disposed below a cutting tool to come into contact with a work and guide movements of the cutting tool.

2. Description of the Related Art

An example of such base attachment structure is disclosed in JAPANESE PATENT LAYING-OPEN GAZETTE No. 5-209475 filed by the inventors of the present invention. In this prior art structure shown in FIG. 5, a jig saw 120 is joined and connected with a base 121, which is disposed below the main body of the dig saw 120 and has a slide aperture 122, by means of a nut 124 and a bolt 123 piercing into the slide aperture 122 to the main body of the jig saw 120. Whereas a control lever 125 is fixed to the nut 124 disposed on a side close to the main body off the jig saw 120, the head of the boll 123 on a side off the base 121 is locked by means of a locking member 126 in order to prevent rotation of the bolt 123. The base 121 is easily locked and unlocked through rotating operations of the control lever 125. This structure allows the base 121 to be fixed by an appropriate clamping force.

The prior art structure using the control lever 125 and the bolt 123 increases the pitch of the threads on the bolt 123 to decrease the stroke of rotation of the control lever 125 for good control ability. This may, however, lead to a drawback of easily loosening the clamped bolt 123. The smaller pitch of the threads, on the contrary, effectively prevents the bolt 123 from being easily loosened, but increases the stroke of rotation of the control lever 125, thereby worsening the control ability. Another problem arising is that the body of the jig saw 120 limits the rotation of the control lever 125.

SUMMARY OF THE INVENTION

The object of the present invention is thus to realize fixation of a base with high reliability by a small stroke of rotation of a control lever.

More specifically, the object of the present invention is to provide a base attachment structure giving a required and sufficient clamping force by a small stroke of rotation of a control lever.

The present invention is directed to a base attachment structure applied for a cutting tool to clamp and fix a base disclosed below a main body of the cutting tool by means of a bolt member. The base attachment structure further includes: a first threaded portion arranged on an upper portion of the bolt member and having threads running in a first direction, the first threaded portion being screwed and fixed to a side close to the main body of the cutting tool; and a second threaded portion arranged on a lower portion of the bolt member and having threads running in a second direction, which is opposite to the first direction, the second threaded portion being screwed and fixed to a side close to the base, wherein the bolt member is rotated in a locking direction to clamp and fix the base to the main body of the cutting tool and in an unlocking direction to release the fixation of the base to the main body of the cutting tool.

In the description hereof, 'the side close to the main body of the cutting tool' or 'the side close to the base' includes a separate member which may be locked to the main body of the cutting tool or the base irrespective of rotation of the bolt member to form a substantially integral structure with the main body of the cutting tool or the base, in addition to the main body of the cutting tool or the base.

Rotation of the bolt member in the locking direction allows the first threaded portion of the bolt member to shift the main body of the cutting tool downward, while allowing the second threaded portion thereof to shift the base upward. The rotation in the locking direction accordingly presses the base against the main body of the cutting tool and fixes the base to the main body.

Rotation of the bolt member in the unlocking direction, on the other hand, allows the first threaded portion of the bolt member to shift the main body of the cutting tool upward, while allowing the second threaded portion thereof to shift the base downward. The rotation in the unlocking direction accordingly releases the pressure of the base towards the main body of the cutting tool and allows detachment of the base from the cutting tool.

In accordance with a preferred application, the base attachment structure further includes a control lever fixed to an upper end of the bolt member projected from the main body of the cutting tool, wherein the second threaded portion of the bolt member pierces into the base and is screwed to a nut member fixed to a rear side of the base.

This preferable structure makes the rotating operation of the bolt member easier and allows the position and orientation of the base to be arbitrarily changed under the condition that the bolt member is rotated in the unlocking direction to release the fixation of the base. The nut member works to prevent the base from being slipped off.

These and other objects, features, aspects, and advantages of the present invention will become more apparent from the following detailed description of the preferred embodiment with the accompanying drawings.

DESCRIPTION OF THE PREFERRED EMBODIMENT

Figure 1:
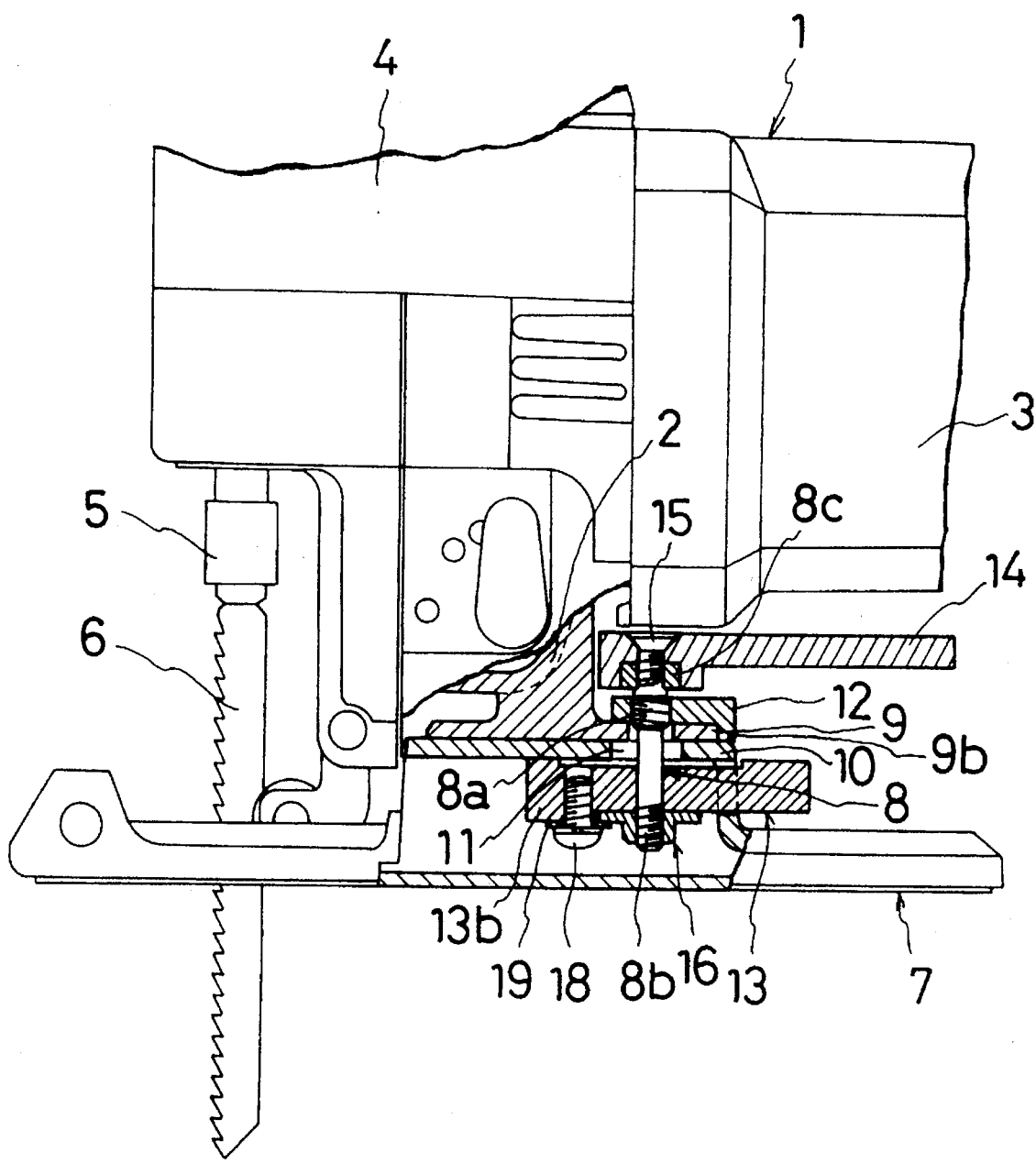
FIG. 1 is a partly broken side view illustrating a jig saw 1, to which a base attachment structure embodying the present invention is applied.

FIG. 1 is a partly broken side view illustrating a jig saw 1, to which a base attachment structure embodying the present invention is applied. The jig saw 1 includes a gear housing 2 for receiving and accomodating a gear mechanism (not shown) therein, a motor housing 3 disposed in the rear (at the right in the drawing) of the gear housing 2 for receiving and accommodating a motor (not shown) therein, and a head cover 4 disposed above the gear housing 2. A blade holder 5 projected downward from a front end (left end in the drawing) of the jig saw 1 is moved up and down by means of the gear mechanism. A vertically extending blade 6 attached to the blade holder 5 pierces into a base 7 to protrude downward. The base 7 is disposed below the gear housing 2 to come into contact with an upper surface of a work and guide movements of the jig saw 1.

Figure 2:
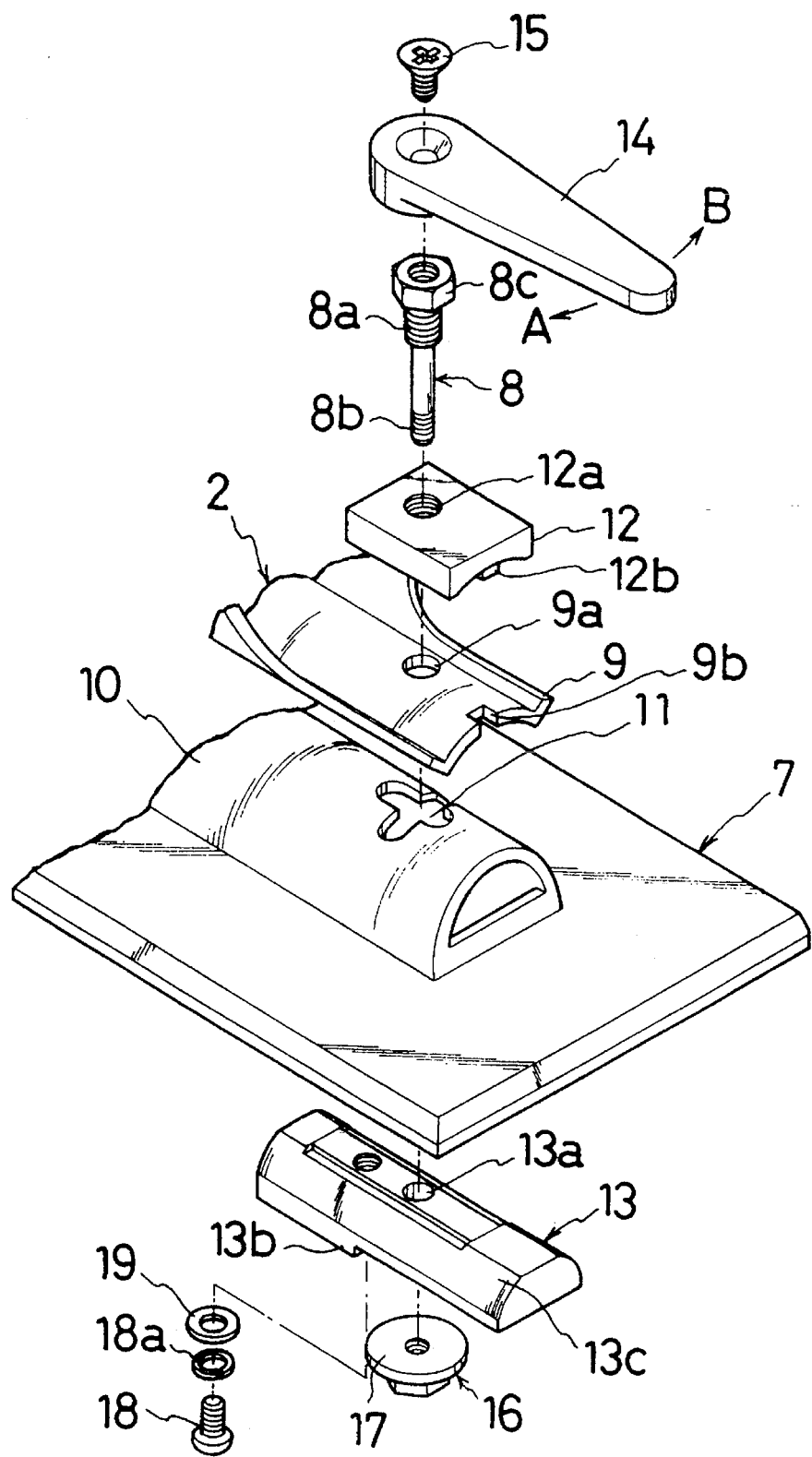
FIG. 2 is a decomposed view illustrating details of the base attachment structure of the embodiment.
Figure 3:
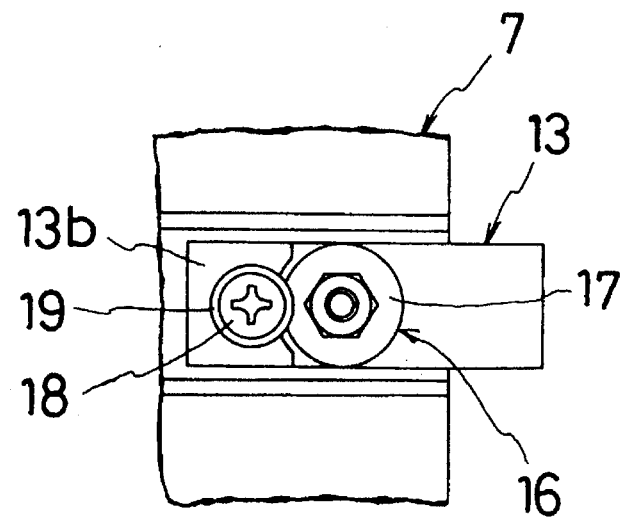
FIG. 3 is a bottom view illustrating a rear face of the clamp plate 13.

An arch-shaped projection member 10 is formed on a substantial center of the base 7 as clearly seen in the decomposed view of FIG. 2. The arch-shaped projection member 10 has a cross-shaped slide aperture 11 formed on the top thereof. The arch shape of the projection member 10 corresponds to and engages with a curved plate 9 extended from the gear housing 2. A vertically extending connection bolt 8 working as the bolt member is inserted and movably fitted in an aperture 9a formed in the curved plate 9 and the cross-shaped slide aperture 11 of the base 7.

The connection bolt 8 includes a first threaded portion 8a arranged on an upper portion of the connection bolt 8 and having threads running in a first direction to form a left-handed screw, and a second threaded portion 8b arranged on a lower portion of the connection bolt 8 and having threads running in a second direction, opposite to the first direction, to form a right-handed screw. The first threaded portion 8a has a greater diameter than that of the second threaded portion 8b. The first threaded portion 8a is fitted and screwed into a left-handed, tapped hole 12a formed in a pressure plate 12. The pressure plate 12 is disposed above the curved plate 9 and has a lower face corresponding to and engaging with the upper face of the curved plate 9.

For secure engagement of the pressure plate 12 with the curved plate 9, the pressure plate 12 has a projection 12b, and the curved plate 9 has a recess 9b corresponding to and engaging with the projection 12b. The engagement of the projection 12b with the recess 9b works to prevent the pressure plate 12 from being rotated to the base 7. In an alternative structure, the pressure plate 12 has a recess (not shown) while the curved plate 9 having a projection (not shown).

The second threaded portion 8b pierces into an aperture 13a formed in an arch-shaped clamp plate 13 arranged below the base 7, and is then screwed to a right-handed fixation nut 16 positioned on the rear face of the clamp plate 13. The curved plate 9 of the gear housing 2 and the arch-shaped projection member 10 of the base 7 are accordingly interposed and fixed between the pressure plate 12 and the clamp plate 13.

A head 8c of the connection bolt 8 formed on the upper end thereof is inserted in a base portion of a control lever 14, which is integrally fixed to the head 8c by means of a flush bolt 15. The control lever 14 allows the connection bolt 8 to be rotated easily without any tool such as a screwdriver. A flange 17 is integrally formed around the fixation nut 16, which is positioned on the rear face of the clamp plate 13 for receiving the second threaded portion 8b of the connection bolt 8. The flange 17 is pressed against the rear face of the clamp plate 13 via a setscrew 18, a waved washer 18a, and a pressure ring 19, which are screwed to a stepped portion 13b formed on the rear face of the clamp plate 13. The flange 17 pressed against the rear face of the clamp plate 13 prevents rotation of the fixation nut 16.

The clamp plate 13 further includes a contact surface 13c having a shape substantially corresponding to and engaging with the rear face of the arch-shaped projection member 10 of the base 7. The contact surface 13c works together with the curved plate 9 to guide back and forth movements and inclining movements of the base 7.

In the base attachment structure thus constructed, the base 7 is locked and unlocked through rotating operations of the control lever 14. When a free end of the control lever 14 is rotated horizontally in a locking direction expressed by the arrow A in FIG. 2, the connection bolt 8 fixed to the control lever 14 rotates clockwise. The left-handed, first threaded portion 8a of the connection bolt 8 accordingly shifts the pressure plate 12 engaging with the curved plate 9 downward. Simultaneously, the right-handed, second threaded portion 8b of the connection bolt 8 is inserted into the fixation nut 16, which is secured by the pressure ring 19 not to rotate, and shifts the fixation nut 16 upward. This makes the distance between the pressure plate 12 and the fixation nut 16 narrower. At the locking position shown in FIG. 4, the curved plate 9 of the gear housing 2 and the arch-shaped projection member 10 of the base 7 are pressed by the pressure plate 12 and the clamp plate 13, so that the base 7 is fixed to the jig saw 1.

When the free end of the control lever 14 is rotated horizontally in an unlocking direction expressed by the arrow B in FIG. 2, the connection bolt 8 fixed to the control lever 14 rotates counterclockwise. The left-handed, first threaded portion 8a of the connection bolt 8 is accordingly inserted into the pressure plate and shifts the pressure plate 12 upward, while the right-handed, second threaded portion 8b of the connection bolt 8 shifts the fixation nut 16 downward. This makes the distance between the pressure plate 12 and the fixation nut 16 wider and releases the fixation of the base 7 to the jig saw 1. The clamp plate 13 prevents the unlocked base 7 from being slipped off. The base 7 under the unlocking condition may be moved horizontally or inclined as shown by the two-dot chain line in FIG. 4 within a range defined by the slide aperture 11 around the connection bolt 8. The horizontal movement and inclination determine the desired position and orientation of the base 7. Rotation of the control lever 14 in the locking position expressed by the arrow A in FIG. 2 fixes the base 7 at the desired position and orientation.

Figure 4:
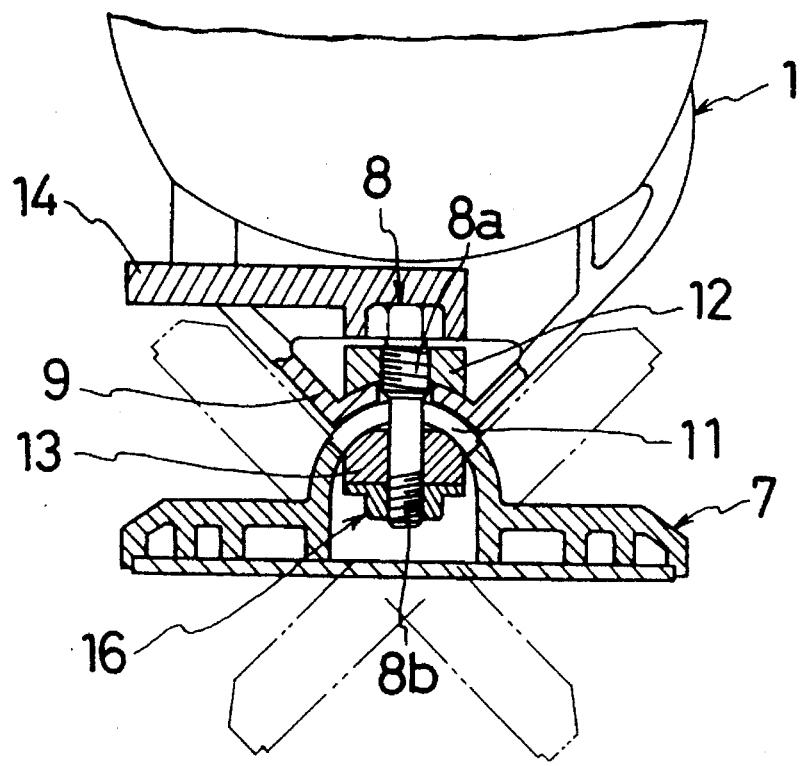
FIG. 4 shows a rotating operation of the control lever 14 to lock the base 7.
Figure 5:
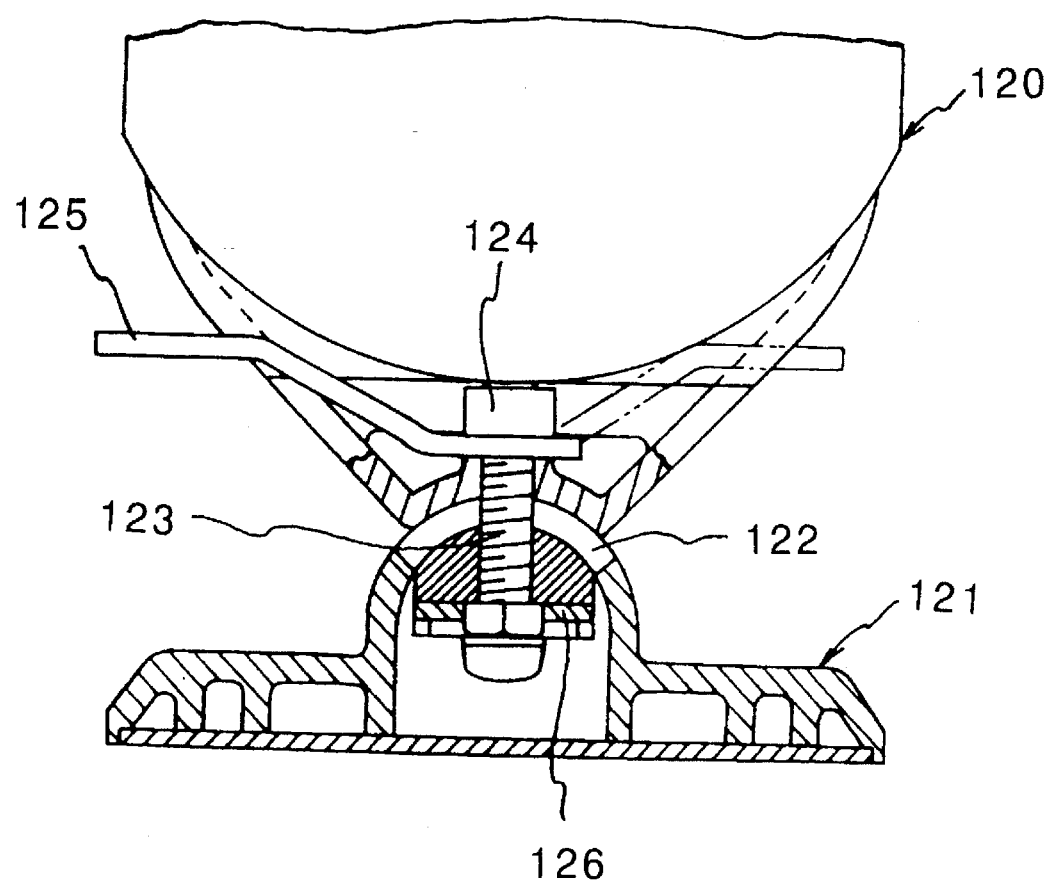
FIG. 5 shows a conventional base attachment structure.

The locking and unlocking operations are simultaneously implemented on both the first threaded portion 8a and the second threaded portion 8b of the connection bolt 8. This structure gives a required and sufficient clamping force by a small stroke of rotation of the control lever 14. The stroke of rotation in the base attachment structure embodying the present invention is less than half the same in the conventional base attachment structure. The structure of the embodiment also prevents the once-locked base 7 from being easily loosened, thereby improving the reliability of base fixation. The structure further improves the control ability of the control lever 14, which is not protruded from the base 7 even under the locking condition as shown in FIG. 4. The control lever 14 docs not accordingly interfere with the cutting operation of the jig saw 1 and is free from any accidental release of the lock.

There may be many other modifications, alternations, and changes without departing from the scope or spirit of essential characteristics of the invention. It is thus clearly understood that the above embodiment is only illustrative and not restrictive in any sense. Some examples of modification are given below.

In the above embodiment, the setscrew 18 and the pressure ring 19 are used to prevent rotation of the fixation nut 16. A modified structure includes a conventional nut in place of the fixation nut 16 integrally formed with the flange 17. In this structure, a recess corresponding to and engaging with the conventional nut is formed on the rear face of the clamp plate 13 for preventing rotation of the conventional nut. The control lever 14 and the connection bolt 8 may be formed not separately but integrally, or the running directions of the threads of the first threaded portion 8*a* and the second threaded portion 8*b* of the connection bolt 8 may be reversed. Another modified structure has neither the pressure plate 12 nor the fixation nut 16, but includes a right-handed or left-handed, tapped hole directly formed in the curved plate 9. In this case, the aperture 13*a* of the clamp plate 13 is also formed to a tapped hole having threads of the opposite direction to those of the tapped boise of the curved plate 9, that is, a left-handed or right-handed, tapped hole. The connection bolt 8 is thus directly screwed to the curved plate 9 and the clamp plate 13 working as the nut member. For certain types of cutting tools to which the base attachment structure of the present invention is applied, the first threaded portion 8*a* is directly screwed to the housing of the cutting tool whereas the second threaded portion 8*b* is fixed to the base.

The scope and spirit of the present invention are limited only by the terms of the appended claims.

What is claimed is:

1. A combination of a base attachment structure and a cutting tool, said attachment structure clamps and fixes a base disposed below a main body of said cutting tool by means of a bolt member, said base attachment structure further comprising a first threaded portion arranged on an upper portion of said bolt member and having threads running in a first direction, said first threaded portion being screwed and fixed to a side close to the main body of said cutting tool, and a second threaded portion arranged on a lower portion of said bolt member and having threads running in a second direction, which is opposite to said first direction, said second threaded portion being screwed and fixed to a side close to said base, wherein said bolt member is rotated in a locking direction to clamp and fix said base to the main body of said cutting tool and in an unlocking direction to release said base from the main body of said cutting tool.

2. The combination structure in accordance with claim 1, said base attachment structure further comprising a control lever fixed to an upper end of said bolt member projected from the main body of said cutting tool, said second threaded portion of said bolt member piercing into said base and being fixed to a nut member locked to a rear portion of said base.

3. The combination in accordance with claim 2, wherein said nut member is locked to said base by means of a screw member, which is inserted from a rear face off said base and screwed to the side close to said base so as to press said nut member against the side close to said base.

4. The combination in accordance with claim 1, wherein said first direction, in which the threads of said first threaded portion run, is a counterclockwise clamping direction relative to the side close to the main body of said cutting tool, said second direction, in which the threads of said second threaded portion run, being a clockwise clamping direction relative to the side close to said base.

5. The combination in accordance with claim 1, wherein said first threaded portion of said bolt member is screwed to a fixation plate, which is secured to the main body of said cutting tool on a side opposite to said base by means of a lock, and passes through the main body of said cutting tool.

6. The combination in accordance with claim 5, wherein said lock of said fixation plate to the main body of said cutting tool comprises a projection arranged on either one of the main body of said cutting tool and said fixation plate and a recess arranged on the other to engage with said projection.

* * * * *